Sept. 1, 1942.  V. M. HENKELL ET AL  2,294,499

BULL PLUG FITTING

Filed Aug. 26, 1940

Inventors.
Victor M. Henkell.
James H. Howard.
Morey M. Zondrager.
By J. Vincent Martin
and
Ralph R. Browning, Attorneys.

UNITED STATES PATENT OFFICE 2,294,499

BULL PLUG FITTING

Victor M. Henkell, James H. Howard, and Morey M. Zorgdrager, Houston, Tex., assignors to McEvoy Company, Houston, Tex., a corporation of Texas Application August 26, 1940, Serial No. 354,228

1 Claim. (Cl. 138—44)

This invention relates to choke fittings for wells, and especially to what is known as a bull plug which is removed when the choke bean has to be changed or renewed. This occurs quite often, because the flow through the choke tends to erode its passage or bore with the result that the flow is increased more than is desired or permitted, as by law.

The object of the invention is to provide an improved bull plug which can be readily inserted or removed and which seals tight when inserted, and the ability to effect a seal is not lessened by repeatedly opening and closing the plug. The plug is also free from sanding or galling the threads. Furthermore, it can be opened or closed by the use of the same wrench that is used to change the choke, and so only one wrench need be used or carried.

The plug is also provided with a bleeder hole and screw which cooperates with a vent bore in the plug to let off pressure during the choke changing operation.

The invention may be embodied in various forms.

Figure 1:
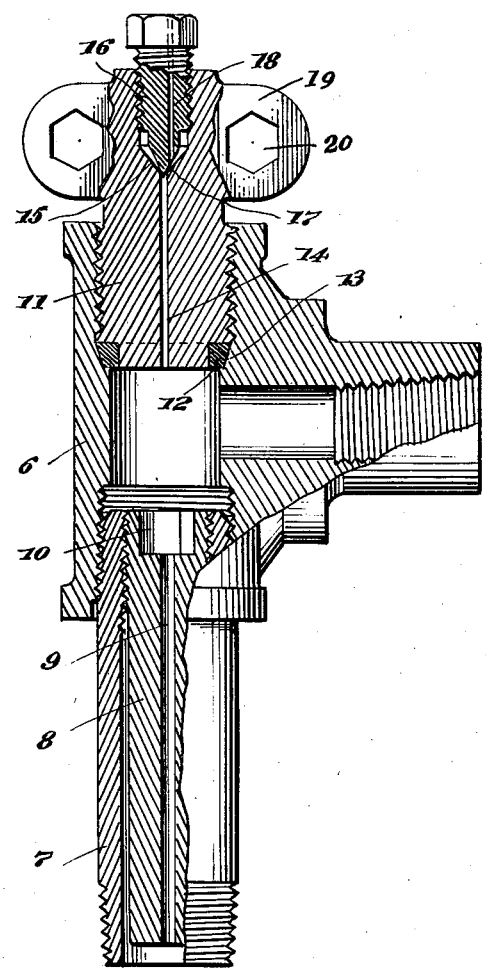
Figure 2:
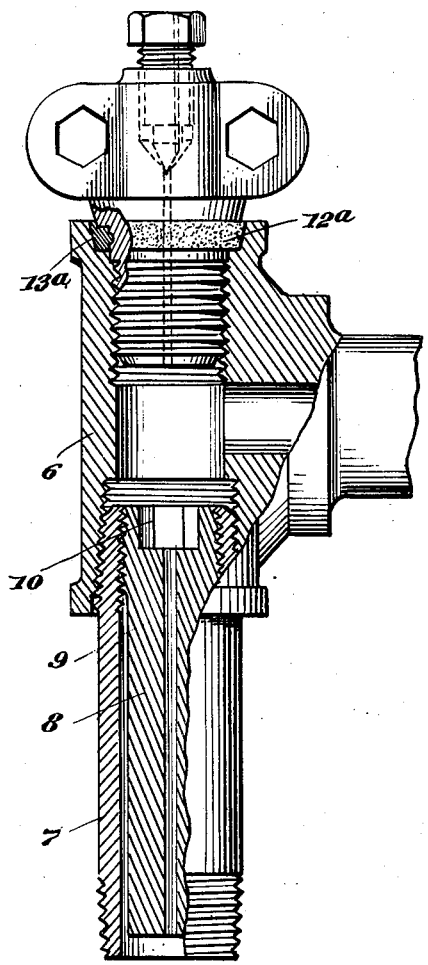

Fig. 1 is a longitudinal section of one form.
Fig. 2 is a similar view of another form.

Referring particularly to the drawing 6 indicates a T-fitting into one arm of which is screwed the flow pipe 7 into the inner end of which is screwed the choke bean 8, having a restricted passage 9 with a non-circular end socket 10 to receive an appropriate wrench which can be inserted and engaged with the choke bean to unscrew or remove the same after the bull plug is removed.

This plug in indicated at 11 and its threads are of the drill pipe type or V-form.

In the form shown in Fig. 1 the inner end of the plug is reduced to receive a copper or other soft metal gasket 12 which is tightened against a tapered seat 13 in the body of the fitting when the plug is screwed in tightly. This gives an effective pressure seal due not merely to the threads but also to the gasket.

Extending lengthwise through the plug is a passage 14 provided at the top with an inclined seat 15 and tapped to receive a bleeder screw 16 which seats at 17 against the corner of the seat 15 at the top of the passage 14. From a point above the needle valve seat thus described the bleeder screw 16 has a small vent bore 18 which is eccentric to the screw and by reason of the construction shown the bleeder hole 18 does not interfere with seating the needle valve at 17, but when the bleeder screw is backed off a little the confined pressure in the fitting and its connection will be vented off and the bull plug can be removed without escape or loss of oil.

Conveniently the plug is provided with one or more wings 19 with holes 20 through which the shank of an ordinary choke wrench can be inserted to screw the plug in or out.

In the form shown in Fig. 2 the construction is as above described except that the gasket 12a is located at the outer end instead of the inner end of the threaded part of the plug, and in such position the gasket seats and is compressed against the tapered seat 13a when the plug is screwed in.

In the forms shown or in modifications thereof, the device will be found very useful. Much trouble has heretofore been met with galled threads, particularly on choke fittings, where bull plugs are used and choke beans have to be changed frequently. Of course, it will be understood that when the choke is to be renewed or removed the usual flow valve is cut off and the bleeder screw is opened slightly, venting the entrapped pressure through the bleeder port 18. Then the plug itself is screwed out conveniently by inserting the shank of the wrench in one of the holes 20 to form a lever, after which the wrench arm may be inserted in the fitting to engage and unscrew the choke bean and remove the same through the plug bore.

Having described our invention, we claim:

The combination with a choke fitting having a choke bean screwed into one arm thereof and a winged bull plug screwed into the opposite arm thereof, said choke bean having its end adjacent said opposite arm formed with a socket adapted to receive a wrench for inserting and removing said bean, and the wing on said bull plug having an opening adapted to receive the same wrench for inserting and removing said bull plug.

VICTOR M. HENKELL.
JAMES H. HOWARD.
MOREY M. ZORGDRAGER.